United States Patent [19]

Dumire

[11] 4,168,109
[45] Sep. 18, 1979

[54] FIBER OPTIC CONNECTOR APPARATUS WITH OPTICAL FIBERS HAVING THERMALLY DEFORMABLE JACKET MATERIAL

[75] Inventor: Leo Dumire, Old Saybrook, Conn.

[73] Assignee: Kabel-und Metallwerke Gutehoffnungshuette AG, Fed. Rep. of Germany

[21] Appl. No.: 798,086

[22] Filed: May 18, 1977

[51] Int. Cl.² .............................................. G02B 5/14
[52] U.S. Cl. ................................ 350/96.22; 350/96.20
[58] Field of Search ................ 350/96.20, 96.21, 96.22

[56] References Cited

U.S. PATENT DOCUMENTS

| 3,846,010 | 11/1974 | Love et al. | 350/96.22 |
|---|---|---|---|
| 3,999,837 | 12/1976 | Bowen et al. | 350/96.22 |
| 4,023,886 | 5/1977 | Nakayama et al. | 350/96.20 |

FOREIGN PATENT DOCUMENTS

| 2529352 | 1/1976 | Fed. Rep. of Germany | 350/96.21 |
|---|---|---|---|
| 2516858 | 10/1976 | Fed. Rep. of Germany | 350/96.21 |
| 2273289 | 12/1975 | France | 350/96.21 |

Primary Examiner—Rolf G. Hille
Attorney, Agent, or Firm—Marn & Jangarathis

[57] ABSTRACT

Fiber optic connector apparatus and methods and apparatus for applying the fiber optic connector apparatus to the fiber optic cable is provided in accordance with the teachings of the instant invention. The fiber optic connector apparatus includes a metallic nose piece having a first apertured end portion for butting optical fibers exposed at the aperture and a second apertured end portion for receiving the fiber optic cable. An application device for holding the nose piece in alignment with cable to be attached is provided to heat the nose piece to a temperature to cause protective sheathing on the cable to flow. Upon melting, an end portion of the cable to be attached is biased against the second apertured end portion to cause it to be displaced into the nose piece as the protective sheathing begins to flow to expose optical fibers at the first end portion and, upon cooling, maintain the portion of the cable within the nose piece in a compressed, adhered condition. In an exemplary embodiment, ferrule means and a threaded body may then be fit front and back about the nose piece, cable junction and a nut may then be secured thereover to ensure the mechanical integrity of the applied connector apparatus.

12 Claims, 7 Drawing Figures

FIBER OPTIC CONNECTOR APPARATUS WITH OPTICAL FIBERS HAVING THERMALLY DEFORMABLE JACKET MATERIAL

The invention relates to fiber optic connectors and application techniques therefor and more particularly to fiber optic terminal and splice connectors and to methods and apparatus for simply and easily applying such connectors to optical waveguides or multifiber cables.

Optical transmission systems employing fiber optic communications techniques are now a reality and promise to revolutionize the world of data transmission in the next decade. This technology, which results from a combination of fiber optic and optoelectric transmission concepts is potentially far superior to transmission systems employing electrical wire techniques as the same manifest a number of inherent advantages when compared to coaxial cable or twisted pair systems. Foremost among these advantages are that the optical systems do not generate nor are they susceptible to outside electromagnetic interference and hence, the RFI/EMI characteristics of the system are markedly improved. Furthermore, in an optical communication system, complete electrical ground isolation is achieved between the transmitter and receiver so that ground loops and common ground shifts in data circuits are eliminated, safe operation in hazardous environments are assured and high voltage isolation is not a problem. In addition, since a fiber optic transmission system does not radiate electronically detectable signals, there is a very low probability of interception or interference problems. Additionally, optical transmission equipment is frequently smaller in size and lighter in weight than comparable electronic systems and optical multichannel systems do not manifest substantial crosstalk problems. Optical transmission systems also manifest a wide signal bandwidth, wide operating temperature ranges, are light weight and of low cost and such systems do not exhibit the substantial losses involved with their electronic counterparts.

The typical fiber optic transmission system comprises three basic components which take the form of a transmitter, fiber optic cable and a receiver. In essence, the transmitter takes the form of a light source which serves to generate a waveform for each possible sequence of digits received as an input thereto from the data source and serves to introduce light representative of the received input to the fiber optic cable for further transmission. Transmitters generally take two forms, namely, a solid state laser which is classified as a coherent emitter and a light emitting diode (LED) which is classified as an incoherent emitter. Each has its own particular characteristics which may prove preferable in given application.

Conversely, the receiver or detector acts to transduce or convert optical radiation received from the fiber optic cable into electrical output signals which are then further manipulated by traditional circuitry.

The fiber optic cable is the transmission path which carries the light signal to be transmitted between the transmitter and the receiver. The cable takes the form of a flexible, continuous fiber or a group of fibers each of which is capable of conducting light from one end to the other with relatively low losses. An individual fiber is generally referred to as an "optical fiber" or "optical waveguide" while a group of fibers packaged together to form a cable is referred to as a "bundle." A conductor that passes an image without distortion is referred to as a "coherent fiber optic" cable or an "image conduit" and a coherent fiber optic cable requires that the exact relative location of every fiber be maintained at both ends of the bundle. Fiber optic materials generally take the form of either a glass compound which is employed for data communication applications or the like, or a plastic which is relied upon for transmission of light images or for short runs in data links.

While the highly specialized design and construction techniques employed for fiber optic cable are beyond the scope of the instant specification, a brief description of certain aspects thereof will be set forth as the same are appropriate for an understanding of the connector apparatus and methods and apparatus for applying the same to fiber optic cables. Physically, an optical waveguide comprises a light guiding core having a high index of refraction which carrys the light power, an optical cladding layer having a slightly lower index of refraction which surrounds the core and isolates the fibers therein to prevent crosstalk, and a protective jacket. The light path of any propogating ray in an optical waveguide is preferably confined to the core and such propogating ray is continually reflected back and forth at the cladding surface as it traverses down the optical waveguide. The cladding layer carries no signal and hence most efficient cable designs are those exhibiting the highest ratio of core to cladding area which is consistent with adequate core isolation. The numerical aperture of an optical waveguide is a characteristic of the specific core/cladding ratio of the optical fiber and represents the degree of openess or the input acceptance cone of the cable. More particularly, the numerical aperture represents the maximum angle of light that the cable will accept and transmit. Light entering at angles exceeding the value of the numerical aperture will be quickly attenuated by the cladding layer and will not be transmitted along the fiber.

The fabrication of optical fibers with low loss characteristics requires highly purified materials, and an extremely fine finish at the surface of the core to minimize absorption and scattering of light. Attenuation in fiber optic cables stems primarily from absorption by transition metal ions and scattering caused by impurities in the glass fiber. Attenuation is measured in decibels per kilometer (dB/Km) at a specific light frequency. Cable efficiency can be increased by packing a number of individual fibers into a bundle. In addition to cladding losses, the degree of compactness chosen in fabricating the bundle affects the cable loss. The ratio of the total fiber area to the total area of the bundle is generally referred to as the Packing Fraction.

Optical fibers are further defined as multimode and single mode fibers. Multimode is indicative that the fiber core diameter is sufficiently large, relative to any operating wavelength, to permit propogation in several modes, each with a characteristic velocity and propogation time. Single mode means the fiber core diameter is small relative to an operating wavelength, so only a single mode of propogation can be supported. Additionally, there are two types of multimode optical fibers known as step index and graded index fibers. Step index fibers have a glass core with a higher index of refraction than that of the surrounding cladding while graded index fibers have a core with an index that continually varies in a parabolic fashion in such manner that the highest value thereof resides at the center of the core. In both types of fibers, light is propogated in many modes and corresponding velocities; however, with graded index fibers there is a smaller difference in propogation delay between the different modes and consequently a wider bandwidth. Graded index fibers may have a bandwidth of up to 500 MHz per kilometer while step index fibers are generally limited to bandwidths of 50 MHz per kilometer. Single optical fibers are available in diameters which range from 0.002 inches to 0.006 inches while bundle diameters range from 0.013 inches to 0.046 inches. Cables are classified as high, medium and low loss cables with the attenuation characteristics manifested thereby ranging from 1,000 decibels per kilometer to as low as 4 decibels per kilometer. With loss characteristics of this nature and considering both the nature of the transmission medium and the form of energy being transmitted; it will be appreciated by those of ordinary skill in the art that all means employed to couple the fiber optic waveguides or the fiber optic cables to the transmitter or receiver as well as to splice the fiber optic transmission medium must achieve coupling in a low loss, highly precise manner so as to not entirely degregate the efficiency of the transmission medium per se.

Thus, while forming a rather minute portion of an optical transmission system, fiber optic connector apparatus employed for splicing or terminal purposes within an optical transmission system serves as a key link therein. Accordingly, such connector apparatus must provide an interface that is capable of achieving signal transfer with loss and performance figures which are compatible with the fiber optic cable technology and in addition thereto, such connector apparatus must be capable of being applied to fiber optic cables in a manner which does not effect the integrity of the cable, is easily accomplished, repeatable, and highly reliable. Since it has been found that coupling is achieved with a minimum insertion loss when the ends of optical waveguides to be spliced are butted, and that coupling with minimum insertion losses occurs when the optical fiber cable is maintained in a slightly compressed condition within the coupling apparatus, it is desireable to employ coupling apparatus which functions within a splicing relationship to maintain the end portion of the optical fiber cable in a slightly compressed condition and precisely align each waveguide therein at an opening so that the same may be precisely abutted to the waveguides within the cable to which the same is to be spliced. Furthermore, as optical fibers are highly delicate in nature, connector apparatus must be capable of application thereto with essentially no physical handling of the optical fiber per se and stripping techniques such as are employed for wire pairs are absolutely forbidden.

Therefore, it is an object of this invention to provide fiber optic connector apparatus which exhibits low insertion losses and may be applied to a fiber optic cable in a highly simplified manner.

It is a further object of the present invention to provide semiautomatic installation techniques for applying the fiber optic connector apparatus according to the instant invention to fiber optic cables.

It is an additional object of the instant invention to provide fiber optic connector apparatus having spring loaded nose pieces which allow connectors to be butted together while avoiding any jamming of the fiber optic interfaces.

It is another object of the instant invention to provide fiber optic connector apparatus and installation techniques therefor which establishes a fiber optic cable in a precisely aligned relationship within the nose piece of the connector apparatus to permit abutting together of interfaces in a highly precise manner.

Other objects and advantages of this invention will become clear from the following detailed description of several exemplary embodiments thereof, and the novel features will be particularly pointed out in conjunction with the appended claims.

In accordance with the teachings of the instant invention, fiber optic connector apparatus and methods and apparatus for applying said fiber optic connector apparatus to fiber optic cable is provided wherein the fiber optic connector apparatus includes a metallic nose piece for accommodating said fiber optic cables; said nose piece includes a first apertured end portion for butting optical fibers exposed at said aperture and a second apertured end portion for receiving said fiber optic cable; applying means for holding said nose piece in alignment with cable to be attached is provided to heat said nose piece to a temperature to cause protective sheathing on said cable to flow whereupon an end portion of the cable to be attached which is biased against said second apertured end portion will be displaced into said nose piece as the protective sheathing begins to flow to expose optical fibers at said first end portion and, upon cooling, maintain the portion of the cable within the nose piece in a compressed, adhered condition; in one exemplary embodiment, ferrule means and a threaded body may then be fit front and back upon the nose piece cable junction and nut means secured thereover to ensure the mechanical integrity of the applied connector apparatus.

The invention will be more clearly understood by reference to the following detailed description of an exemplary embodiment thereof in conjunction with the accompanying drawings in which:

FIGS. 5A and 5B illustrate connector apparatus of the type illustrated in FIG. 1 interconnected in a spliced relationship through an exemplary embodiment of splice connector apparatus according to the instant invention wherein FIG. 5A depicts the entire assembly and includes a portion broken away to show the fiber optic splice interface while FIG. 5B is a partially expanded view depicting connector apparatus employed to achieve the spliced relationship illustrated.

Figure 1:
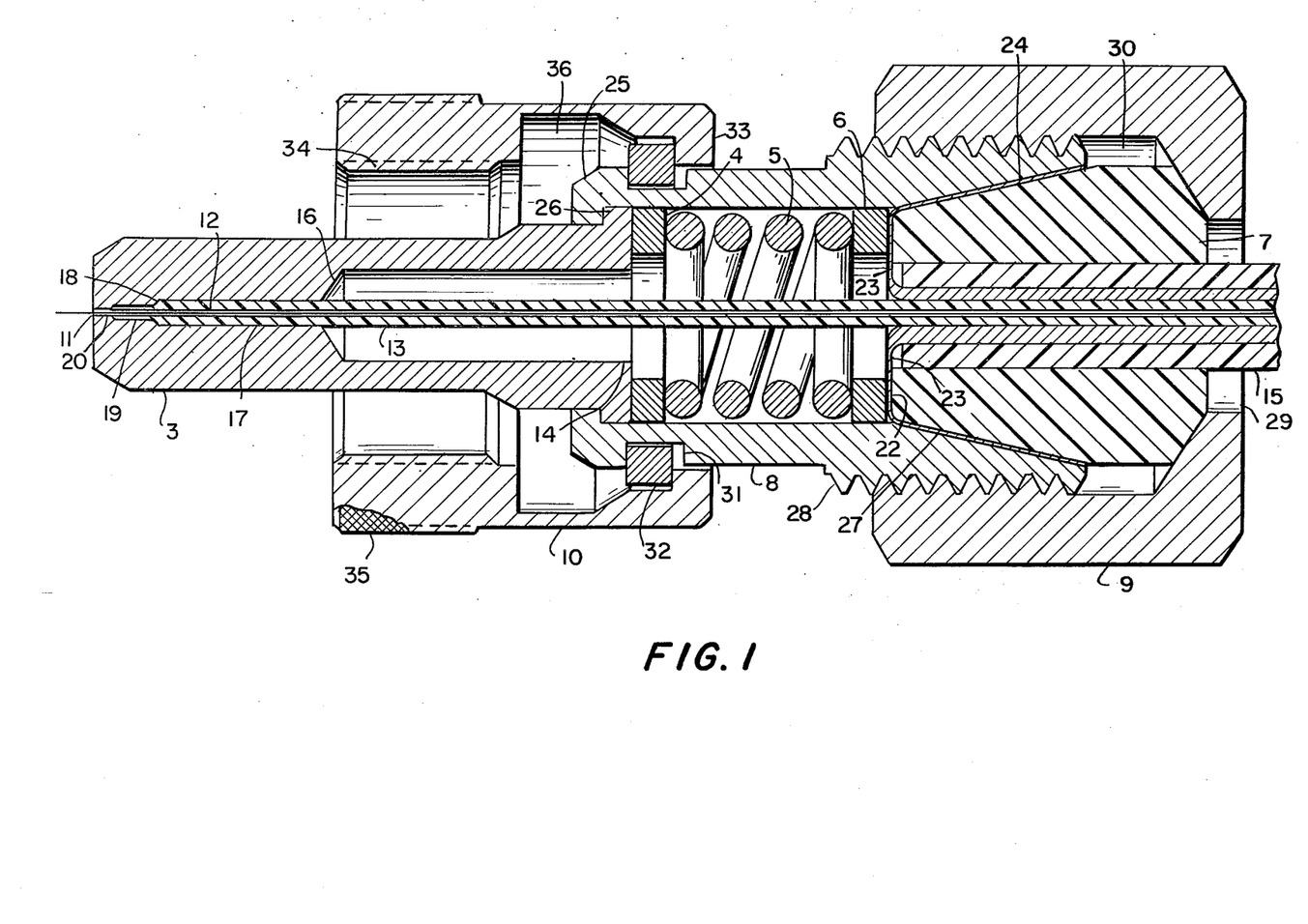
FIG. 1 is a sectional view illustrating an exemplary embodiment of fiber optic connector apparatus in accordance with the teachings of the present invention.

Referring now to the drawings and more particularly to FIG. 1 thereof, there is shown a sectional view of an exemplary embodiment of fiber optic connector apparatus according to the teachings of the present invention. More particularly, in FIG. 1, a connector assembly generally indicated as 1 is shown attached to a fiber optic cable 2 which, in this exemplary embodiment, has been shown as a cable having a single glass fiber therein. Thus, while it will be apparent to those of ordinary skill in the art that connector apparatus according to the instant invention may be configured to accommodate fiber optic cables having either single glass fibers or bundles of glass fibers therein the embodiment of the invention shown in FIG. 1 has been employed in connection with an illustration of a single fiber cable to simplify the representations set forth. The exemplary connector 1 comprises a nose piece 3, a washer 4-spring 5-washer 6 combination, a ferrule 7, a connector body 8, a back nut 9, and a coupling nut 10.

The nose piece 3 is the only finely machined element within the instant coupling arrangement and requires dimensioning within close tolerances to assure that the subject connector apparatus will exhibit an insertion loss which is acceptable within the system. More particularly, the nose piece 3 has a longitudinally disposed aperture having a circular cross section at the front 11 portion of the nose piece 3 which is slightly larger than the circular cross section of the cable core formed by the glass fiber but substantially less than the cross section of the inner jacket 13 of the glass fiber cable. The opposite end 14 of the nose piece 3 has a circular cross section which is substantially larger, as indicated, than the circular cross section of the inner jacket 13 of the fiber optic cable but substantially less than that exhibited by the outer jacket 15 of the fiber optic cable. Internally, the opening within the nose piece 3 may be graduated in the manner illustrated in FIG. 1 such that a first section therein exhibits the diameter of the opening in the back end 14 of the nose piece 3, and has a longitudinal extent which corresponds to approximately half the length of the nose piece. This opening then tapers, in the manner indicated by the aslantly disposed line 16, to a more narrow opening whose diameter is slightly less than the diameter of the inner jacket 13 of the optical cable. The second section 17 is further tapered as indicated by the aslantly disposed line 18 into a third section of the nose piece whose diameter is substantially less than that exhibited by the inner jacket 13 of the optical fiber cable. Finally, a fourth section 20 is provided whose diameter slightly exceeds that of the cross section of the cable core formed by the glass fibers it being noted that the diameter of the glass section 20 of the opening is such as to permit only the single glass fiber illustrated in FIG. 1 to pass therethrough surrounded only by a thin layer of material associated with the melted portion of the inner jacket of the optical fiber cable. Furthermore, it should be noted that each section of the opening illustrated within the nose piece 3 tapers into the succeeding adjacent more narrow opening so that the inner jacket will flow from one opening portion to the next under the influence of only a small biasing force under conditions where the inner jacket has been heated to a sufficient degree to cause the same to begin to melt. The front of the nose piece 11 should be machined to a fine degree so that the same is vertical as well as smooth as the same serves, as shall be seen in greater detail below, as a flat surface through which the butting of exposed optical fibers is achieved. The nose piece is preferably formed of a material which can be machined to close tolerances and will not be adversely affected by encountered environmental conditions. An exemplary material which has been found to be highly suitable for this purpose is brass which has been nickel-plated.

Figures 2, 3A, 3B:
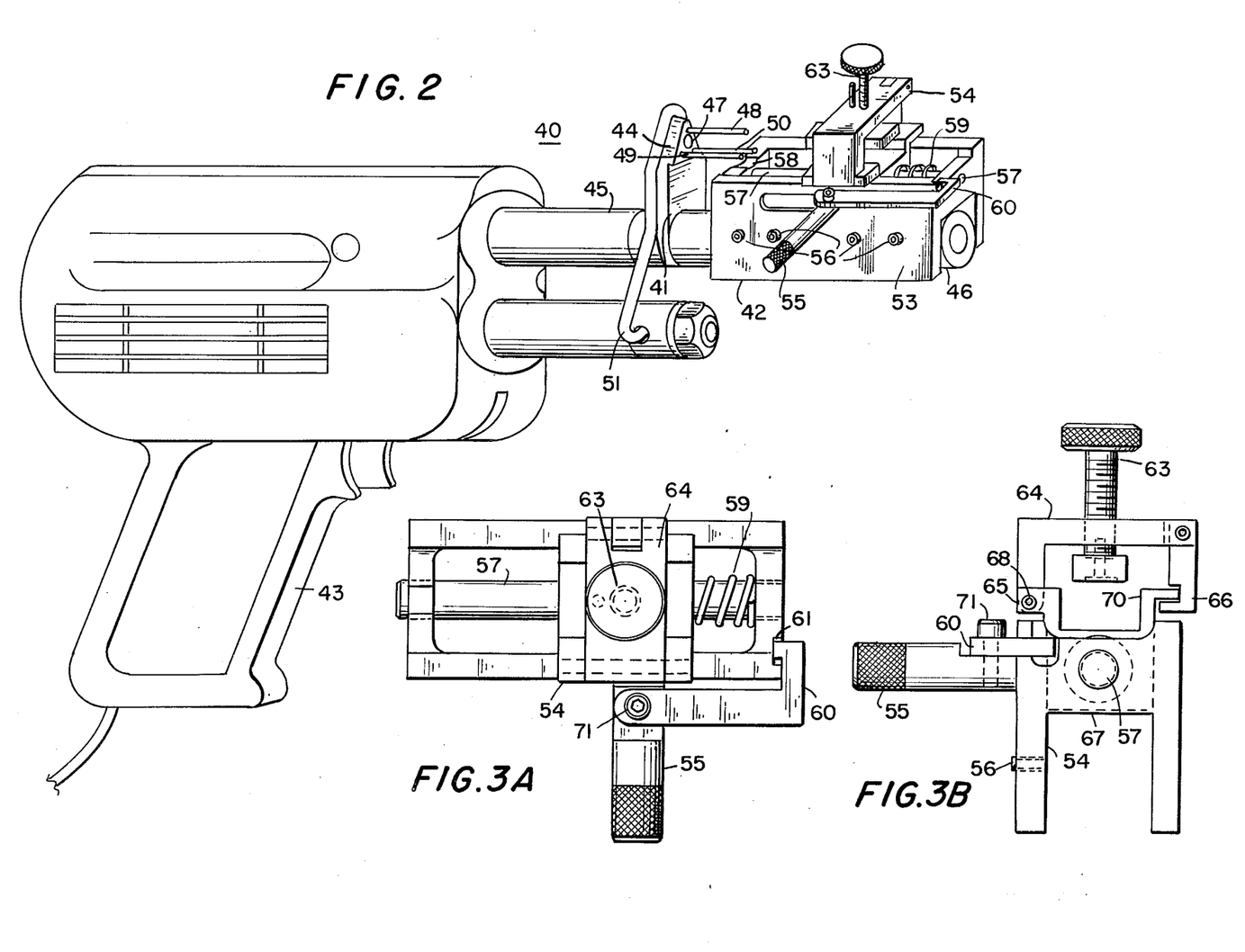
FIG. 2 is a pictorial view of an exemplary insertion tool for fiber optic connector apparatus in accordance with the teachings of the instant invention.
FIGS. 3A and 3B illustrate details of the clamp mechanism employed in the exemplary insertion tool illustrated in FIG. 2.

While the manner in which the connector assembly illustrated in FIG. 1 is fitted to a fiber optic cable will be rendered more apparent in conjunction with the description of the specialized apparatus therefor illustrated in FIG. 2, it should here be appreciated that a portion of the fiber optic cable having the outer jacket removed therefrom is inserted into the nose piece 3 so as to occupy the rearmost portion thereof wherein the cavity has a cross sectional extent which is substantially larger than the diameter of the inner jacket 13. The nose piece is then heated to a degree to cause the plastic material associated with the inner jacket 13 to flow and a small forward bias is placed on the cable to which the nose piece is being affixed. When the plastic inner jacket begins to flow the bias applied to the fiber optic cable in an axial direction will cause the cable to pass fully into the nose piece 3 guided in passing by the aslantly disposed shoulders at the interfaces at each of the sections. This will continue until the fiber optic cable is fully within the nose piece and a small portion of the cable core formed by the glass fiber passes out of the front aperture in the nose piece. As the cable passes into the nose piece while the inner jacket is in a melted condition, the inner jacket will assume a cross sectional configuration which corresponds to the cross section of the longitudinal aperture within the nose piece whose diameters are less than that originally associated with the inner jacket 13. As this occurs, a compressing force is applied to the glass fibers so that when the glass fibers pass longitudinally through the nose piece while the insulating material is in a flow condition, its passage through the confining volume creates a high compression melt condition within the nose piece and upon a removal of the heat and subsequent solidification of the inner jacket a positive adhesion will exist between the nose piece 3 and the glass fiber core due to the melted insulation therebetween. This positive adhesion will normally create a locking effect between the glass fibers and the nose piece 3 at the end of the cable; however, since the metallic nose piece never engages any of the glass fibers directly but is always separated therefrom by the compressed insulating material of the inner jacket, there is assured not only a compact glass fiber or bundle thereof, but in addition thereto, the glass fiber or bundle of glass fibers is not subject to damage due to functional forces that are characteristic of coupling devices having metallic members that directly engage glass fibers. Under most conditions plastics employed for the inner jacket will readily here to the interior walls of the nose piece upon solidification; however, for plastics which do not so adhere to the nickel plated nose piece, the inner diameter of the second section 17 or second and third sections 17 and 19 may be threaded to provide appropriate captivation upon a solidification of the inner jacket. However, what is important to focus upon is that this technique of bringing the fiber to the interface maintains the glass fiber itself free from any handling or exposure that may cause fracture in the glass fiber itself and thus, this method of application of the nose piece avoids substantial increases in losses which might otherwise occur.

The washer-spring-washer mechanism formed by the washers 4 and 6 and the spring 5 is disposed behind the nose piece 3 within the connector assembly 1. This mechanism serves to allow a certain amount of play in the nose piece when the nose piece is mated with a second nose piece or the like to achieve a spliced relationship in that an abutting relationship between exposed optical fibers at the end 11 of the nose piece may be obtained without any fear of losses which might occur through a jamming together of the optical fibers when too much pressure is placed on the interfaces when the same are abutted. Thus, since the washer 4-spring 5-washer 6 combination will allow the nose piece to move backward within the connector assembly 1 whenever a force is imposed at the front portion 11 of the nose piece which exceeds the bias of the spring 5, a butting relationship of exposed optical fibers at the front ends of two nose pieces may be established without any fear of exerting too much pressure at the interface to cause a jamming of the exposed optical fibers or the like. The washer and spring assembly is designed so that the nose piece can be repolished many times and still maintain a butt interface, thus insuring the least optical loss through the connector. Thus, the washer spring washer mechanism supplied within the connector assembly illustrated ensures that the lowest loss is realized when the glass interfaces abut.

Behind the washer 6 is located a ferrule 7 which is preferably made of nylon or the like. The ferrule has a central opening, as indicated, which is sufficient to accept the outer jacket of the fiber optic cable to which the connector apparatus illustrated in FIG. 1 is to be attached. The ferrule 7 is configured in the well known manner illustrated in FIG. 1 and when the same is fitted over the fiber optic cable, the front portion 22 of the ferrule 7 should be aligned with the end portion 23 of the outer jacket 15 of the fiber optic cable so that the full interior extent of the ferrule 7 is proximate the outer circumference of the end portion of the outer jacket 15 in the manner illustrated in FIG. 1. Additionally, should the fiber optic cable contain a strength member 23 such as Kevlar fibers or the like which is commonly interposed in fiber optic cables intermediate the inner and outer jackets in the manner illustrated in FIG. 1, such strength members 23 should be threaded about the front portion 22 of the ferrule 7 and aligned about the outer periphery 24 thereof in the manner illustrated in FIG. 1. This is done so that when the connector body 8 and back nut 9 are subsequently fitted over the ferrule 7 in the manner indicated in FIG. 1, the strength members 23 will be embedded into the nylon ferrule 7 under the compression asserted by the connector body 8 when the back nut is tight to cause a sound mechanical interconnection with the fiber optic cable. This sound mechanical connection with the fiber optic cable will occur, as will be appreciated by those of ordinary skill in the art, by the embedding of the strength members 23 into nylon ferrule 7 under the compressive forces asserted by the connector body 8 as well as due to the compressive forces exerted by the ferrule on the portion of the outer jacket 15 which has been fitted therethrough.

The connector body 8 is configured in the manner illustrated in FIG. 1 to fit over the nose piece 3 and interlock at the front portion 25 thereof with the annular shoulder 26 at the end portion of the nose piece 3. This effectively, as will be appreciated by those of ordinary skill in the art, locks the nose piece 3 in place to allow only a rearward displacement thereof against the force exerted by the spring 5. The rear portion of the connector body 8 is provided with an outward sloping conical portion 27 which acts in the well known manner to fit over the nylon ferrule 7. The exterior portion of the connector body 8 overlying the outward sloping conical interior portion 27 as well as the cavity within the connector body 8 in which the washer 6 and a portion of the spring 5 are contained is threaded in the manner indicated by the threads 28. The threaded portion of the outer connector body 8 is thus adapted to receive the back nut 9 in the well known manner. More particularly, the back nut 9 has a small aperture therein which is adapted to easily fit over the outer jacket 15 of the fiber optic cable. This apertured portion 29 of the back nut opens up into a wider cavity 30 within the back nut and the interior portion of the back nut interconnecting the cavity 30 and the apertured portion 29 are aslantly disposed in a manner to correspond to the aslantly disposed rear portion of the ferrule 7. The forward portion of the cavity 30 is provided with threads to mate with the threads 28 provided at the rear portion of the connector body 8.

In this manner, when the ferrule 7 is fit from the back and the connector body is fit thereover from the front, the subsequent fitting of the back nut from the rear will push the ferrule member forward while compressing the rear portion of the connector body against the ferrule as the back nut is tightened. Thus, as tightening of the back nut proceeds, the nose piece 3 is prevented from further displacement assuring the mechanical connection thereof within the connector in such manner that displacement can only occur in a rearward axial direction, while a sound mechanical connection to the outer jacket 15 of the fiber optic cable is achieved through the compressive forces asserted between the ferrule and the conical interior portion of the connector body 8. In addition, the strength members 24 will tend to inbed into the nylon ferrule 7 as the compressive forces exerted by the conical portion of the connector body 8 are increased. Thus, a sound mechanical connection to the fiber optic cable is assured.

The front portion of the connector body 8 is additionally provided with an annular groove 31 adapted to accept a retainer ring 32. The retainer ring 32 is additionally adapted to mate with the coupling nut 10 and lock the same in place so that it may not be removed from the connector body. More particularly, the coupling nut is provided with a downwardly directed annular lip portion 33 which prevents the coupling nut from being removed in the forward direction and will provide a forward bias on the connector when the coupling nut is tightened to a recepticle or splicing connector in the manner shown in FIG. 5. The forward portion of the coupling nut is threaded in the manner indicated by the dashed line 34 so as to mate with a splicing connector or other terminal connector of the well known type while the outer front portion of the coupling nut 35 is provided with an exterior knurl to facilitate connection. A medium diamond knurl may be employed for this purpose. The interior portion of the coupling nut 10 is provided with a large cavity 36 configured in the manner shown. Cavity 36 is employed in the manner well known to those of ordinary skill in the art to provide an area into which the retainer ring 32 may be inserted prior to mating with the connector body 8. Thereafter, the coupling nut 10 is fit to the connector body 8 by being fitted thereover, and forced to the rear whereupon the retainer ring 32 heretofore nestled within the cavity 36 slips over the front of the connector body 8, and into the annular groove 31 to fixedly interconnect the coupling nut 10 to the connector body 8. As will be appreciated by those of ordinary skill in the art, the interrelationship between the downwardly directed lips 33 on the coupling nut 10, the retainer ring 32 and the connector body 8 is such that when the coupling nut 10 is joined to a male connector and the coupling nut is tightened, the nose piece 3 will be biased in the forward direction as the coupling nut is tightened.

While the highly simplified manner of application of the connector 1 illustrated in FIG. 1 to a fiber optic cable will be best appreciated in connection with FIG. 2, the highly advantageous structure thereof with respect to mating with and providing an interconnection for a fiber optic cable may be appreciated from the structure illustrated in FIG. 1. Thus, only the single glass fiber surrounded by an extremely thin layer of the melted portion of the inner jacket 13 of the fiber optic cable will be exposed at the front 11 of the nose piece 3 while the glass fiber per se is protected from the metallic inner portion of the nose piece 3 by graduated thickness portions of the inner jacket 13 which adhered thereto while the inner jacket 13 was in a melted condition. This means that the inner jacket 13 is adhered to the front portion of the nose piece over a substantial length to ensure a physical bond of appropriate strength while the single glass fiber therein is at all times insulated from the metallic nose piece 3. Furthermore, as the technique employed for inserting the inner jacket into the nose piece 3 involves a heating of the nose piece per se to cause the inner jacket 13 of the fiber optic cable to flow, no physical forces of substantial magnitude are engendered during the attachment process which could damage the single glass fiber therein. Additionally, as no cutting or stripping process is associated with the inner jacket, the usual sources which cause damage to the glass fiber core are avoided. It should also be noted that the adherence of the inner jacket 13 to the nose piece avoids damage to the glass fiber interior of the fiber optic cable even under conditions where bending and twisting near the connector occur. Similarly, the manner in which the ferrule 7 and associated portions of the connector body 8 and the back nut 9 cause a compressive fit to the outer jacket of the fiber optic cable ensure that physical coupling at the connector is achieved to both the inner and outer jackets of the fiber optic cable so that bending forces associated with the connector or on the cable per se will not dislodge the connector due to the interconnection at various layers of the fiber optic cable. Additionally, the machining of the nose piece ensures that a proper butting relationship may be uniformly achieved at the glass interface since that flat surface thereof at which the glass fiber is exposed can readily be mated to a corresponding flat surface in which another glass fiber is exposed to achieve low loss interconnection. Furthermore, this relationship is enhanced due to the spring loading of the nose piece 3 by the washer 4-spring 5-washer 6 packing of the nose piece which allows the nose piece within the connector to be displaced in a rearward direction so that an appropriate butting relationship at the glass interface can be achieved without fear of jamming the glass fibers in a manner which would substantially enhance the loss. While the embodiment of the connector 1 illustrated in FIG. 1 has been disclosed in connection with a single fiber cable, it will be appreciated that multifiber cable bundles may be used therewith and interconnected in essentially the same manner disclosed, except that the interior cavities within the nose piece would be modified, in an appropriate manner to accept the enlarged cable and a ferrule 7 having a wider central portion would also be employed; however, in other areas, the standard connector configuration disclosed in conjunction with FIG. 1 would be used.

Referring now to FIG. 2, there is shown a pictorial view of an exemplary insertion tool for fiber optic connector apparatus in accordance with the teachings of the instant invention. The exemplary insertion tool 40 illustrated in FIG. 2 may take the form of a modified 750 watt soldering gun from which the soldering tip has been removed and to which a head piece 41 and cable feed assembly 42 has been added. Other than through the removal of the soldering tip and the addition of the head piece 41 and the cable feed assembly 42, the soldering gun 43 is conventional so that a detailed description thereof is unnecessary. Such a conventional 750 watt soldering gun is available from the Weller Corporation or the like. The head piece 41 may comprise as shown an apertured vertical member 44 adapted to be fitted onto the top heating element 45 of the soldering gun and held in place by a bolt on extension 46 which fits the bolt threads employed for holding the upper portion of the soldering tip. The top portion of the apertured vertical member 44 is triangular in shape and contains a second aperture 47 adapted to accept the foremost portion of the nose piece 3 illustrated in FIG. 1. The top portion of the apertured vertical member 44 has three rods 48–50 inserted therein so as to be horizontally disposed equidistantly about the circumference of the aperture 47 to accept and hold a nose piece while the same is heated for the insertion of a fiber optic cable. The topmost portion of the head piece 44 assembly is configured in a triangular shape and is built up in the manner indicated so as to concentrate the heat generated by the soldering gun 43 about a nose piece inserted into the rods 48–50 and through the aperture 47 without heat loss due to an excessive amount of metallic material. When the tip of a nose piece 3 is disposed within the aperture 47 and rests horizontally within the rods 48–50, it is disposed horizontally and is aligned, as shall be more apparent below, with a fiber optic cable disposed in the cable feed assembly 42. The circuit between the heating elements and the soldering gun 43 are completed through the head piece 41 by the connection of a connector element 51 through the apertured portion of the lower heating element where it is held in place by the front bolt mechanism thereof and is bent around the top triangular portion of the head piece 41 in the manner shown and brazed or welded in place.

Accordingly, it will be appreciated by those of ordinary skill in the art that when a nose piece is disposed within the head assembly 41 and the soldering gun 43 is energized, the nose piece will be held horizontally in place by the combination of the aperture 47 and the horizontally disposed rods 48–50 while heat is uniformly conducted thereto by the soldering gun in the well known manner. the width of the built-up triangular section of the head assembly 41 is preferably such that almost the entire nose piece may be disposed therein for heating while only the rearmost portions thereof are disposed within the horizontally disposed rods 48–50 to achieve maximum heat transfer. Thus, should it be desired, the built-up portion of the nose piece could be of a substantial width so as to accept the complete nose piece assembly in its entirety whereupon the apertured portion 47 thereof would be such as to prevent the nose piece from sliding therefrom by accepting the entire nose piece except for the shoulder portions 26 thereof illustrated in FIG. 1.

The cable feed assembly 42 is mounted upon the upper heating element 45 of the soldering gun 43 and is adapted to receive fiber optic cable to which a connector is to be affixed and more particularly, to hold the same in place while applying, when desired, a forward axial bias thereto. The cable feed assembly 42 comprises a main body 53, a displaceable clamping assembly 54, and a displacement lever 55. The clamping assembly 42, as aforesaid, serves to clamp the end portion of a fiber optic cable to be inserted into a nose piece mounted in the head assembly 41 in proper alignment therewith so that the stripped end portion of the fiber optic cable may have the inner jacket 13 inserted into the initial portion of the nose piece. Thereafter, as the nose piece heats to cause the plastic of the inner jacket 13 of the fiber optic cable to melt, the same may be biased in a forward direction to flow into the nose piece 3 in the manner aforesaid either under a manual bias applied to the fiber optic cable via the displaceable clamping assembly 54 or under a spring bias applied thereto in a manner to be described hereinafter.

The main body 53 of the cable feed assembly 42 is affixed to the upper heating element 45 of the soldering gun 43 through an extension 46 and a plurality of set screws 56 or the like which are fitted through threaded apertures within the main body 53 so as to lock the main body 53 onto the upper heating element extension 46. The set screws 56, depending upon the width of the main body, may be mounted from either one or both sides of the main body 53; however, it is preferred that the width of the main body 53 be sufficiently configured to the width of the top heating element 45 so that said set screws 53 need only be inserted from one side of the main body. A shaft 57 is centrally disposed in the upper portion of the main body 53 and it is upon this shaft that the displaceable clamping assembly 54 is adapted to ride s that a fiber optic cable can be fed into the nose piece upon a melting of the plastic material associated with the inner jacket. The main body 53 may be provided with a groove or notch 58 in which the outer jacket 15 of a fiber optic cable clamped into the displaceable clamping assembly 54 is adopted to ride. The notch or groove 58 thus serves as an additional guide to ensure that the short length of fiber optic cable between the nose piece and the displaceable clamping member 54 is displaced in a horizontal direction so that a perfect fit within the nose piece is achieved as the inner jacket 13 of the fiber optic cable begins to melt and is displaced towards the front portion of the nose piece 3. The structure of the displaceable clamping assembly 54 may be best appreciated in conjunction with FIGS. 3A and 3B which illustrate details of the clamp mechanism employed in the exemplary insertion tool shown in FIG. 2.

FIG. 3A illustrates a top view of the clamping assembly while FIG. 3B shows a front view thereof. Thus, turning to the top view illustrated in FIG. 3A, it will be seen that the displaceable clamp assembly 54 rides on the shaft 57 and is displaceable in an axial direction therealong so as to urge a section of fiber optic cable clamped therein in a forward direction, axially into the nose piece 3. Thus, it will be appreciated by those of ordinary skill in the art that the displaceable clamp assembly 54 may be displaced axially along the central axis of the shaft 57 to urge a piece of fiber optic cable clamped therein into the nose piece as the inner jacket thereof begins to melt. A spring mechanism 59 is provided at the rear of the shaft 57 so as to apply a forward bias on the displaceable clamping assembly 54 when the clamping assembly is not otherwise held in place. The axial mounting of the spring 59 on the shaft 57 will, as well known to those of ordinary skill in the art, assure that the bias applied to the displaceable clamping assembly 54 is axial so as to drive a clamped portion of the fiber optic cable into the heated nose piece when the displaceable clamping assembly 54 is in a displaceable condition. The displacement lever 55 is provided for manual displacement of the displaceable clamping assembly 54 so that the same may be manually urged along the shaft 57 either forward toward the nose piece or back against the spring 59 to overcome the bias thereof. A latch 60 is additionally provided in the manner indicated so that when the same is engaged in the notched portion 61 of the main body 53, the displaceable clamping assembly 54 is held in a position which overcomes the bias imposed by the spring 59. Thus typically, under normal operating conditions, the tip of a fiber optic cable to be joined to a connector assembly according to the instant invention is inserted into the nose piece in the manner indicated in conjunction with FIG. 1 while the outer jacket of the fiber optic cable is clamped in the displaceable clamping member 54 with the position of the clamping member as shown in FIG. 3A where the same is latched into a position to overcome the bias of the spring 59. Thereafter, the nose piece is heated and as soon as the inner jacket 13 of the fiber optic cable begins to melt the latch mechanism 60 is released so that the spring bias asserted by the spring 59 on the displaceable clamping member 54 will drive the displaceable clamping member 54 as well as the fiber optic cable clamped therein in a forward axial direction to drive the melted inner jacket and the fiber optic waveguide therein fully into the nose piece. Alternatively, these steps may be implemented and thereafter the latch mechanism 60 released while the displacement lever 55 is held and thereafter slightly urged forward so that the insertion of the melted inner jacket 13 as well as the fiber optic waveguide therein into the nose piece occurs under manual operational conditions.

The manner in which the displaceable clamping assembly is configured is best shown in conjunction with FIG. 3B. The clamping assembly 54 comprises, as best shown in FIG. 3B, a threaded clamping member 63, a retaining plate 64, a clamping plate 65, a locking arm 66, and an apertured block 67 which rides upon the shaft 57 and receives a forward bias, as aforesaid, from the spring 59. The clamping plate 65 is affixed to the apertured block 67 so that only a forward displacement may be imparted to the clamping assembly 54. The retaining plate 64 is pinned via a locking pin means 68 to the clamping plate 65 so that the same is pivotable thereabout. Similarly, the locking arm 66 is pinned to the retaining plate 64 and is pivotable thereabout so that the whole assembly comprising the locking arm 66 and the retaining plate 64 will swing away from the clamping plate 65 to permit a fiber optic cable to be easily and readily disposed therein. The locking arm is adapted, however, in the manner illustrated in FIG. 3B to engage an extending member 70 of the clamping plate so that once a fiber optic cable has been engaged therein, the assembly comprising the locking arm 66 and retaining plate 64 may be pivoted over the clamping plate 65 with the fiber optic cable in place and secured by the locking arm 66. Thereafter, the threaded clamping member 63 would be screwed down until the outer jacket of the fiber optic cable were securely clamped. It should be noted however, that since the use of the exemplary insertion tool is to extend to various forms of fiber optic cables including both single fiber and fiber optic bundles as well as variously dimensioned cables of each kind an insert may be provided for the clamping plate, as generally illustrated in FIG. 2 so that various sizes of cable may be readily accommodated by the tool while properly disposed in an axial alignment so that the center of the fiber optic cable aligns with the center of the nose piece disposed in the head piece. It should also be noted in conjunction with FIG. 3B, that the latch mechanism is pivoted through a mounting to the displacement lever 55 through a threaded member 71 which has sufficient clearance to allow free pivoting of the latch member 60.

While the exemplary insertion tool for fiber optic connector apparatus in accordance with the teachings of the instant invention has been shown in FIG. 2 according to a first modification of the 750 watt soldering gun other variations will readily occur to those of ordinary skill in the art. For instance, it may prove more convenient for certain applications or installers if the head piece 41 were rotated 180° on the end of the top heating element 45 and the cable feed assembly 42 were also rotated and mounted directly to the heating element 45 near the body of the gun so as to now be at the rear portion of the tool and rotated 180° so that cable is fed into the nose piece from the rear of the tool toward the front. In addition, other variations will readily occur to those of ordinary skill in the art which may be readily implemented using standard equipment so long as it is recognized that the key to employing the exemplary connector apparatus according to the instant invention is that the nose piece thereof is inserted into a heating means and a cable having a short portion of the outer jacket 15 removed therefrom is fed thereinto through a clamping mechanism adapted to precisely align the center of the cable with the center of the nose piece. Hence, as the nose piece is heated the inner jacket of the fiber optic cable inserted thereinto will begin to melt whereupon the inner jacket of the fiber optic cable may fully enter the nose piece whereupon the nose piece is allowed to cool and hence secure the inner jacket of the fiber optic cable thereto. While other assembly details should be apparent, it should be noted that the ferrule 7 and the back nut 9 are placed on the fiber optic cable so as to reside at some location in back of the cable feed assembly. Conversely, the washer 4-spring 5-washer 6 combination is threaded over the stripped portion of the fiber optic cable as the same comes from the cable feed assembly 42 and is inserted into the nose piece. Thereafter, the nose piece is heated and the latch 60 is released so that the melted inner jacket on the fiber optic cable moves fully into the nose piece through the washer 4-spring 5-washer 6 combination. Subsequently, when the nose piece cools and adhesion of the inner jacket to the nose piece occurs, the cable and nose piece may be removed from the tool, the nylon ferrule 7 pushed forward until it engages the washer 6 and the strength member 24, which was exposed during removal of the outer jacket, layed over the ferrule 7 and thereafter the connector body applied over the nose piece so as to be disposed in an overlying relationship to the nylon ferrule 7. Thereafter, the back nut is pushed forward and is tightened about the threads 28 on the connector body to pull the connector tight about the ferrule 7 and cause the ferrule 7 to crush down on the outer jacket 15 of the fiber optic cable making a tight mechanical bond therewith.

These techniques for the assembly of the exemplary embodiment of the connector apparatus illustrated in FIG. 1 assures that the connector apparatus may be quickly and easily assembled to a fiber optic cable without any physical operations being carried out on the fiber optic cable itself except for a stripping of a short portion of the outer jacket. Thereafter, the connector is assembled employing the exemplary installation tool illustrated in FIG. 2 under such conditions that no forces are imposed on the fiber optic cable which are capable of damaging the same at the relatively short end portion thereof which is operated upon as the same is rigidly secured between the nose piece and the clamping head assembly so that only axial forces which will not damage the fiber optic waveguide or bundle are imposed. Thus in this manner installation can be quickly and easily achieved in the field or at other sites where a splicing operation or terminal connection are to be implemented.

Figure 4:
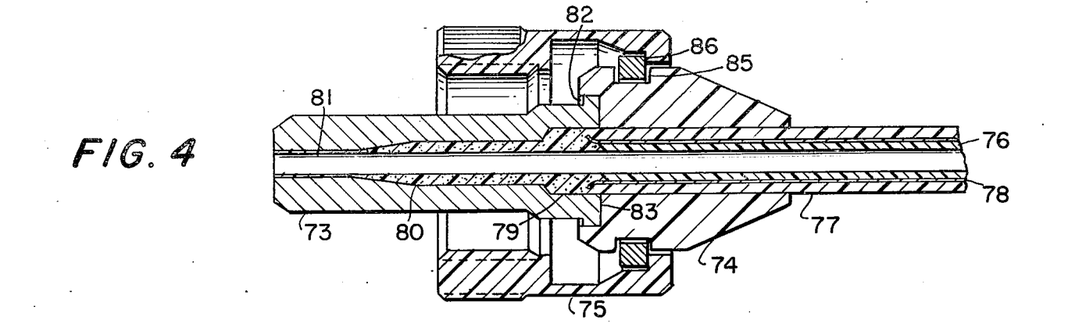
FIG. 4 is a sectional view illustrating another exemplary embodiment of fiber optic connector apparatus in accordance with the teachings of the present invention.

Referring now to FIG. 4, there is shown a sectional view illustrating another exemplary embodiment of fiber optic connector apparatus in accordance with the teachings of the instant invention. The fiber optic connector apparatus illustrated in FIG. 4 is a highly simplified version of the connector apparatus illustrated in FIG. 1 and is much less costly to produce. It is highly suitable for fiber cables with small diameters or those having no strength members therein. The alternate embodiment of the connector apparatus illustrated in FIG. 4 is also suitable for applications where very little stress is generated on the connector per se. Installation techniques for the connector apparatus illustrated in FIG. 4 are precisely the same as those discussed for and illustrated in conjunction with FIG. 1 and hence would employ an application tool such as is shown in FIG. 2 or the like.

Turning now particularly to FIG. 4, the exemplary connector apparatus illustrated therein comprises a nose piece member 73, a coupling body 74, and a coupling nut 75 and retaining ring 86. The exterior configuration of the nose piece 73 may take precisely the same form illustrated in FIG. 1 for the nose piece 3; however, the interior portions thereof are generally dimensioned to accommodate the smaller diameter fiber optic cables to which this particular embodiment of the invention is specially suited. In addition, the nose piece 73 may be somewhat longer than the nose piece 3 illustrated in FIG. 1 or alternatively, if the same sizes are used, a smaller interior portion thereof has a wide dimension as it is preferred that the axial length of the interior portion of the nose piece 73 adhere to the jacket of the fiber optic cable being coupled thereto. Thus, in FIG. 4, the fiber optic cable having a reduced entrance dimension is illustrated as connected to the exemplary connector shown therein. This fiber optic cable includes an inner jacket 76 and outer jacket 77 and the strength member 78. The exemplary connector apparatus illustrated in FIG. 4 is also specifically adapted to accept small diameter fiber optic cables which do not employ a strength member 78 and hence, as will be appreciated by those of ordinary skill in the art, these cables would have just a single jacket surrounding the optical waveguide. In joining the small diameter fiber optic cable to the nose piece 73, the same techniques discussed in conjunction with FIG. 2 are employed with the single exception that no stripping of the outer jacket occurs so that as the nose piece is heated to a condition where it will cause the outer jacket to be placed in a flow condition as well as the inner jacket, the fiber optic cable to be inserted therein is displaced in a forward direction within the nose piece and the melted jacket on the fiber optic cable is displaced in a rearward direction within the nose piece while sufficient material remains between the fiber optic waveguide and the walls of the nose piece to adequately protect the fiber optic waveguide and provide bonding to the nose piece. In addition, the provision of a threaded interior within the nose piece to enhance captivation of the melted portion of the cable is also readily available. Furthermore, a comparison of the nose piece 73 illustrated in FIG. 4 with that shown in FIG. 1 will render it apparent that the internal dimensioning of the graduated cavities is somewhat different. Thus, the larger cavity 79 which is adapted to accept the full width of the cable is relatively small while the cavities 80 and 81 are relatively large so that adherence of the melted jacket material to the nose piece takes place with regard to the major portion of the internal length of the nose piece. It should be noted that the cavity 80 is of substantial length to accommodate displaced melt material from the small cavity 81 which is substantial as only a thin layer of jacket remains therein. The nose piece 73 is made of nickelplated brass so as the same is readily machinable in the manner described in conjunction with FIG. 1.

The connector body 74 is configured in the manner illustrated in FIG. 4 and has a central opening therein which is adapted to tightly fit over the outer jacket 77 of the fiber optic cable and to frictionally engage therewith. The connector body 74 may be made of nylon and is provided with a downwardly disposed lip portion 82 adapted to annularly engage the annular shoulders 83 on the nose piece 73 in the manner illustrated. It should be noted that the downwardly ascending lips 82 on the nylon body 74 are rather thin so as to exhibit sufficient flexibility so that the same may be snapped in place after the nose piece has been coupled to the fiber optic cable whereupon the nylon connector body 74 may be pushed downwardly on the fiber optic cable and into engagement with the shoulders 83 on the nose piece.

The nylon connector body 74 is additionally provided with an annular groove 85 adapted to accept the nylon retainer ring 86. The retainer ring 86 functions in precisely the same manner as the retainer ring 32 described in conjunction with FIG. 1 except the same is here made of nylon to appropriately function with the nylon retainer body 74 and the coupling nut 75 which is also made of nylon. The coupling nut 75 may take precisely the same form as the coupling nut 33 described in conjunction with FIG. 1 except the same is here made of nylon. Thus, in the exemplary connector apparatus illustrated in FIG. 4, interconnection between the cable and the metallic nose piece is achieved in essentially the same manner described in connection with FIG. 2; however, a more substantial bond is achieved at the nose piece while the flexibility of the nylon body and coupling nut are relied upon to compensate for the lack of a strong mechanical bond at the back of the interconnection to the coupling apparatus.

Figure 5A:
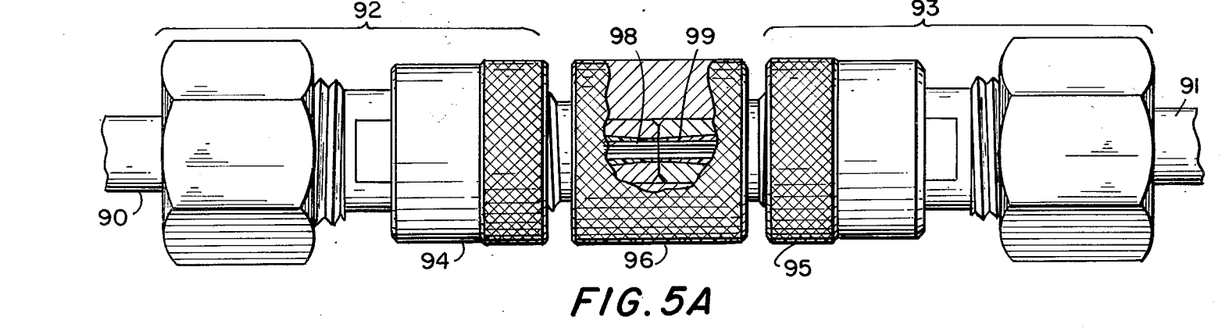
Figure 5B:
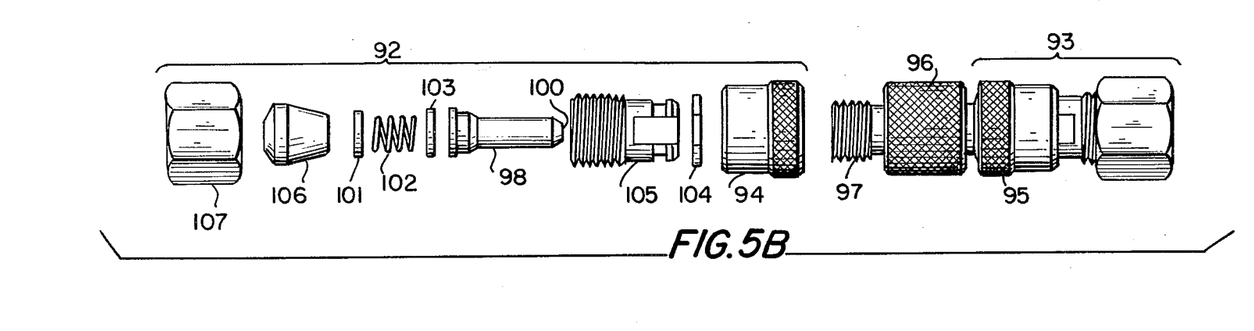

Referring now to FIGS. 5A and 5B, there is shown connector apparatus of the type illustrated in FIG. 1 interconnected in a spliced relationship through an exemplary embodiment of splice connector apparatus according to the instant invention. FIG. 5A depicts the entire assembly and includes a portion which has been broken away to illustrate the fiber optic splice interface while FIG. 5B is a partially expanded view depicting the connector apparatus employed to achieve the spliced relationship shown in FIG. 5A. Due to the structural correspondence between FIGS. 5A and 5B, the description of these figures is set forth together, it being appreciated that an appreciation of the assembled relationship may best be seen with respect to FIG. 5A while the individual elements of the connectors employed may be best viewed with respect to FIG. 5B. As best shown in FIG. 5A, a spliced relationship between a pair of fiber optic cables 90 and 91 is achieved through the use of first and second connector apparatus 92 and 93 which are connected to their respective fiber optic cables 90 and 91 in the manner described in conjunction with FIG. 2. Thereafter, the coupling nut 94 and 95 of each connector assembly is tightened onto splice connector apparatus 96 in accordance with the teachings of the instant invention. The splice connector apparatus 96 is a double ended male member whose threaded portion 97 is adapted to mate with the coupling nut 94 and 95 on each of the connectors affixed to the fiber optic cables 90 and 91. As the coupling nuts 94 and 95 are tightened onto the spliced body 96 the nose piece 98 and 99 of each connector are brought into an abutting relationship in the manner illustrated in FIG. 5A so that the flat machined surfaces thereof are butted together aligning each of the fiber optic waveguides therein in the manner illustrated by the broken away section of the spliced body shown in FIG. 5A. In this manner a low loss butted interconnection may be achieved at the interface between the nose pieces 98 and 99 to obtain extremely low loss interconnection at the interface therebetween. Jamming of the fiber optic cable at the nose piece interface is avoided due to the displaceable mounting of the nose piece within each connector assembly since the same is permitted to be displaced in a rearward direction due to the washer 101-spring 102-washer 103 arrangement, as aforesaid, provided within each connector.

FIG. 5B is also useful in illustrating the relationship between the coupling nut 94, the retainer ring 104, the connector body 105, the nose piece 98, the washer 101-spring 102-washer 103 combination, the nylon ferrule 106, and the back nut 107. Thus, the left side of FIG. 5B which is an exploded view of the connector assembly per se additionally serves to facilitate an appreciation of the manner in which the connector apparatus cooperates. While FIGS. 5A and 5B illustrate the connector apparatus of the instant invention employed with a splice body 96 to achieve a spliced relationship, it will be appreciated by those of ordinary skill in the art that a terminal coonnection to transmitter or receiver apparatus or the like would be simply and easily achieved through the provision of a terminal which would correspond, in essence, to one half of the spliced body illustrated in FIGS. 5A and 5B.

While the instant invention has been disclosed in conjunction with several exemplary embodiments thereof, various variations and alternatives thereto will be readily apparent to those of ordinary skill in the art. Thus, anywhere a male/female relationship has been shown among members, such relationship could be readily reversed without deviating a whit from the teachings of the instant invention. Additionally, size and material variations are also available so long as strength and flexibility requirements are maintained. Similarly, with regard to the interconnection apparatus illustrated in FIG. 2, it will be appreciated by those of ordinary skill in the art that various alternatives are readily available therefor. Thus, for instance, the heating and insertion steps may be achieved by hand or through different mechanical apparatus therefor without deviating a whit from the teachings of the instant invention.

Although the invention has been described in connection with several exemplary embodiments thereof, it will be understood that many modifications will be readily apparent to those of ordinary skill in the art; and that this invention is intended to cover any adaptations or variations thereof. Therefore, it is manifestly intended that this invention be only limited by the claims and the equivalents thereof.

What is claimed is:

1. Connector apparatus for connecting fiber optic cable having at least one optical fiber and a thermally deformable jacket material therein, comprising:
a metallic nose piece taking the form of an elongated member having first and second end portions and a plurality of axially disposed cavities therein, said first end portion exhibiting a finely machined flat surface and having a first aperture therein for exposing each fiber within said fiber optic cable, said second end portion having a second aperture therein for accepting an end portion of said fiber optic cable into said nose piece, and said plurality of axially disposed cavities interconnecting said first and second apertures through the interior of said nose piece, a first and second of said plurality of axially disposed cavities corresponding in cross-section to the cross-section of said first and second apertures, and at least a third cavity interconnecting said first and second cavities, said third cavity having a cross-section intermediate that of said first and second cavities and smaller than the cross-section of the thermally deformable jacket material prior to deformation thereof, to accept thermally deformable jacket material from said fiber optic cable as said end portion thereof is displaced toward said first cavity, said third cavity being configured to create a compressive melt condition in said thermally deformable jacket material as said end portion is displaced toward said first cavity to cause positive adhesion within said third cavity upon a solidification of said jacket material, said cross-section of said first cavity and said first aperture being only substantially sufficiently large to admit therethrough each optical fiber in said fiber optic cable having a thin layer of jacket material thereabout; and
means for engaging said second end portion of said nose piece and said fiber optic cable to additionally secure said nose piece to said fiber optic cable.

2. The connector apparatus according to claim 1 wherein at least one of said plurality of axially disposed cavities is threaded about the periphery thereof to provide captivation for thermally deformable jacket material which has hardened within that cavity.

3. The connector apparatus according to claim 1 additionally comprising:
means for coupling said flat surface of said nose piece in an abutting relationship to another fiber optic cable; and
means for mechanically interconnecting said means for coupling to said means for engaging.

4. The connector apparatus according to claim 3 wherein each of said means for engaging and said means for coupling are formed of Nylon.

5. The connector apparatus according to claim 4 wherein at least one of said plurality of axially disposed cavities is threaded about the periphery thereof to provide captivation for thermally deformable jacket material which has hardened within that cavity.

6. The connector apparatus according to claim 1 wherein said means for engaging includes compression means disposed behind said second end portion of said nose piece, said compression means permitting said nose piece to be displaced in a rearward direction with respect to said engaging means against said compression means whenever a force exerted at said flat surface of said nose piece exceeds a predetermined value.

7. The connector apparatus according to claim 6 wherein said means for engaging comprises:
ferrule means for engaging an outer jacket of a fiber optic cable engaged in said nose piece;
a connector body for engaging said second end portion of said nose piece and fitting over said ferrule means, an exterior portion of said connector body fitting over said ferrule means being threaded; and
back nut means fitting over said ferrule means and said outer jacket of said fiber optic cable for engaging said threaded portion of said connector body.

8. The connector apparatus according to claim 7 wherein said compression means comprises spring means disposed within said connector body intermediate said second end portion of said nose piece and said ferrule means.

9. The connector apparatus according to claim 6 wherein at least one of said plurality of axially disposed cavities is threaded about the periphery thereof to provide captivation for melted jacket material which has hardened within that cavity.

10. The connector apparatus according to claim 6 additionally comprising:
means for coupling said flat surface of said nose piece in an abutting relationship to another fiber optic cable; and
means for mechanically interconnecting said means for coupling to said means for engaging.

11. The connector apparatus according to claim 3 additionally comprising splice body means taking the form of an elongated member having apertures at either end thereof and a cavity therein interconnecting said apertures, said splice body means having mating means associated with each of said apertures for mating with said coupling means, said mating means and said spliced body means being configured to accept said nose piece within said aperture when said mating means is engaged with said coupling means to dispose said flat surface of said nose piece within said cavity in an abutting relationship with another nose piece coupled through said other aperture.

12. The connector apparatus according to claim 10 additionally comprising splice body means taking the form of an elongated member having apertures at either end thereof and a cavity therein interconnecting said apertures, said splice body means having mating means associated with each of said apertures for mating with said coupling means, said mating means and said spliced body means being configured to accept said nose piece within said aperture when said mating means is engaged with said coupling means to dispose said flat surface of said nose piece within said cavity in an abutting relationship with another nose piece coupled through said other aperture.

* * * * *